Sept. 7, 1954  G. ANSEL  2,688,400
EXTRUSION SCALPING DIE
Filed Nov. 1, 1950   2 Sheets-Sheet 1
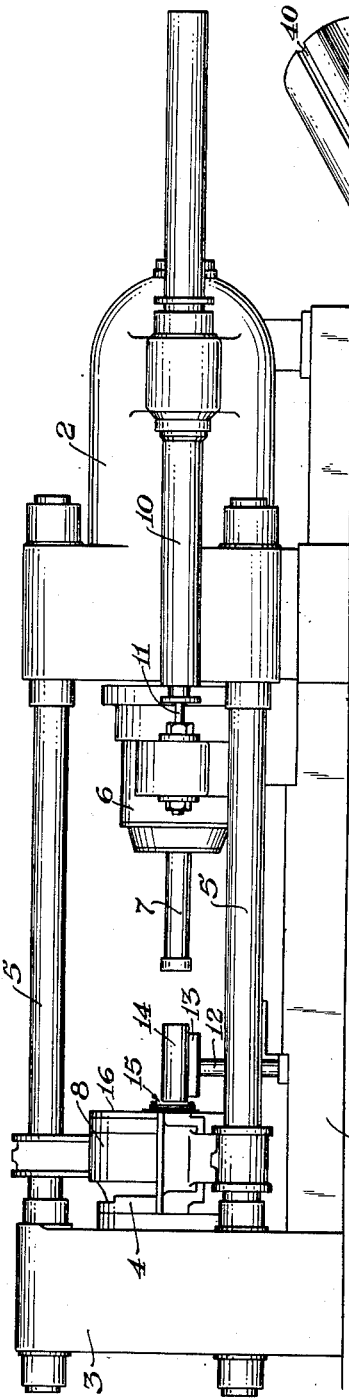
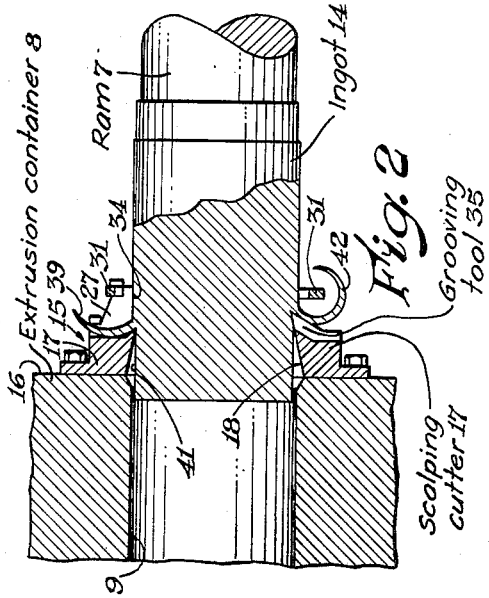
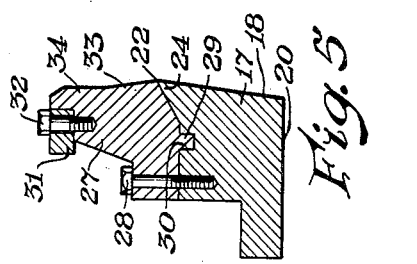
INVENTOR.
Gerhard Ansel
BY
Griswold & Burdick
ATTORNEYS Sept. 7, 1954             G. ANSEL             2,688,400

EXTRUSION SCALPING DIE

Filed Nov. 1, 1950             2 Sheets-Sheet 2

INVENTOR.
Gerhard Ansel

BY

Griswold & Burdick
ATTORNEYS

Patented Sept. 7, 1954

2,688,400

UNITED STATES PATENT OFFICE 2,688,400

EXTRUSION SCALPING DIE

Gerhard Ansel, Midland, Mich., assignor to The Dow Chemical Company, Midland, Mich., a corporation of Delaware Application November 1, 1950, Serial No. 193,393

3 Claims. (Cl. 207—2)

1

The invention relates to an improved method of and apparatus for the hot working of metal. It more particularly concerns an improved extrusion apparatus in which heated cast ingot is formed into extrudes which are free from the usual contaminants derived from the casting skin on the ingot.

In the case of the readily oxidizable metals, particularly magnesium and the magnesium-base alloys, the outside layer or skin of the ingots cast for the charge of the extrusion press is invariably contaminated with oxide. The outside layer of the ingots also has other defects, such as folds and laps as well as blow holes, particularly when the ingots are made by the direct chill casting method. The thickness of this contaminating layer oftentimes is as much as ¾ inch. Before sound uncontaminated extrudes can be made from cast ingot, it is necessary to remove the outer layer and form a substantially level surface. This removal of the outer layer is termed "scalping," and, in the case of cylindrical ingots, is performed by turning the ingot in a lathe between centers and taking a cut which is about ½ to ¾ of an inch so as to expose clean sound metal and form a level surface on the scalped ingot.

Not only is this operation time consuming but it also involves additional labor and waste of metal occasioned in providing the centering holes for supporting the ingot in the lathe. These holes usually have a depth and diameter of 1 to 2 inches. A particular disadvantage of these holes is that they give rise to blistering in the extrudes due to air and foreign matter (e. g. lubricant) therein trapped.

It is the principal object of the invention to provide an extrusion apparatus by which the scalping of the ingot to be extruded is effected as a part of the extrusion operation, thereby obviating additional handling and machining of the ingot as well as the necessity for drilling centering holes and their attendant contaminants.

The foregoing and related objects of the invention are attained by placing at the mouth of the extrusion container a scalping die, the cutting edge of which defines the opening through the die. The opening is made smaller than the cross section of the unscalped ingot and the opening of the container, and by forcing the ingot, by means of the ram of the extrusion press, through the die into the container, the outside layer of the ingot is sheared off as the ingot enters the container of the extrusion press. The

2 resulting scalped ingot is the proper size for the container and has a level surface. It enters the container hot without the need for a separate machining and reheating operation and contamination is avoided.

The invention will now be more fully described and illustrated in connection with the annexed drawing in which:

Fig. 1 is a side elevation partly in section showing an extrusion press embodying the invention.

Fig. 2 is an enlarged fragmentary side elevation partly in section of a portion of Fig. 1 showing the scalping die in operation.

Fig. 5 is a section through the scalping die on the line 5—5 of Fig. 3.

Fig. 6 is a section through the scalping die on the line 6—6 of Fig. 3.

Fig. 7 is an isometric view of an ingot prepared with the apparatus shown.

In the several views, like numerals designate like parts.

Figure 3:
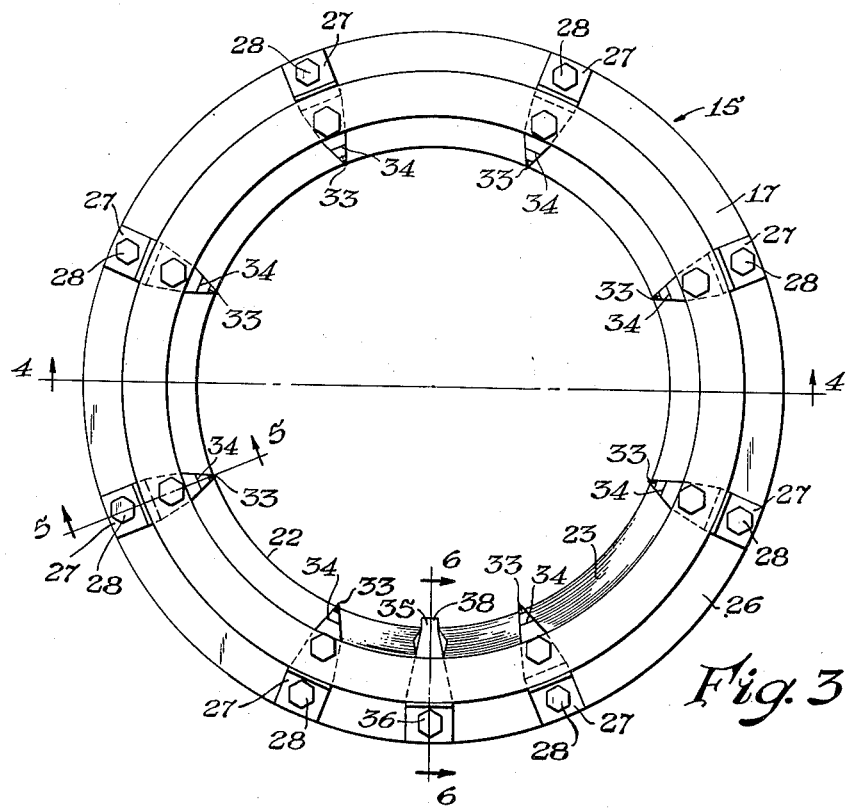
Fig. 3 is a view of the scalping die from the ingot entering end.
Figure 4:
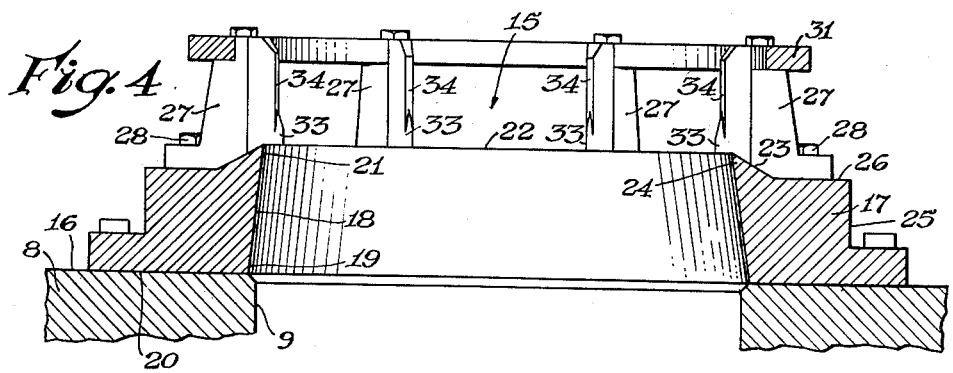
Fig. 4 is a section through the scalping die on the line 4—4 of Fig. 3.

The extrusion press shown is conventional. It comprises a bed plate 1 on which is mounted the hydraulic cylinder 2 and header 3 for supporting the extrusion die 4. The header 3 and hydraulic cylinder 2 are tied together by the rods 5. Piston 6 operates in the hydraulic cylinder and carries the ram 7. Backed up by die 4 is the extrusion container 8 supported by tie rods 5 so that the axis of the bore 9 of the container is in alignment with the long axis of the ram 7. In hydraulic cylinders 10 operate pistons (not shown) connected to piston rods 11, the outer ends of which are secured to the piston 6 and serve to retract the piston 6 after its working stroke. Mounted upon bed plate 1 between the container 8 and ram 7 is the ingot elevator 12 having a rotatably platform 13 for supporting an ingot 14 in position to begin the scalping operation, as shown in Fig. 1.

The scalping die, indicated generally by numeral 15, is shown mounted on the charging end 16 of the container 8. It comprises a ring shaped member 17 having a tapered bore 18. The larger open end 19 of the bore terminates in a plane face 20, the smaller open end 21 in a circular cutting edge 22. The outer face 23 of the ring adjacent to the cutting edge slopes downwardly and outwardly from the bore to form a buttress 24 for the cutting edge. Between the buttress 24 and the cylindrical outer face 25 of the ring is a plane annular surface 26 on which is mounted a number of guides 27 which are secured to the ring 17 by bolts 28. The guides are provided with a tenon 29 which fits into a groove 30 in the annular surface 26 to prevent the guides from twisting. A ring 31 is fastened by bolts 32 to the upper end of each guide to provide added strength. As shown, the lower portion of the inside of each guide, adjacent to the cutting edge 22, is provided with an inwardly facing V-shaped cutting edge 33. The inside of the outer end portion of the guides before the cutting edge 33 is provided with a guide surface 34, the plane of each of which is tangent to the circumference of the ingot to be extruded and parallel to the axis of the container. The diameter of the opening of the scalping die at the cutting edge 22 is smaller than that of the ingot by the amount of the thickness of surface metal to be removed from the ingot.

Mounted on the ring member 17 between a pair of adjacent guides is a grooving tool 35 for forming a longitudinal shallow groove in the side of the ingot. The grooving tool is secured to the ring member 17 by bolt 36. The grooving tool is provided with a tenon 37 which fits into groove 30, thereby preventing the tool from twisting. As shown, the tool 35 is provided with a cutting edge 38 projecting inwardly a short distance beyond the cutting edge 22.

In operation, the ingot to be hot worked, as by extrusion, is first heated to a suitable plastic deformation temperature, as between about 650° and 850° F. in the case of the magnesium-base alloys of the compositions ordinarily used in making articles by hot working. The suitably heated ingot is placed upon the platform 13 and the platform elevated or lowered, if necessary, by elevator 12 until the axis of the ingot is aligned with the axis of the container bore 9. Shown in this position is an ingot 14 of Fig. 1.

The ram 7 is then advanced, by the piston 6 actuated by hydraulic cylinder 2, so as to force the ingot while hot through the ring 31 and past the guide surfaces 34 which keep the ingot in alignment with the bore of the container 8. As the ingot continues to advance, it meets the cutting edge 22 of the scalping die 15 as well as the cutting edges 33 at the bottom of the guides, and the cutting edge 38 of the grooving tool 35. The cutting edge 22 chisels off the outer layer of the ingot. The metal thus removed becomes split into curled bands 39 by the cutters 33. At the same time, grooving tool 35 forms a longitudinal groove 40 in the scalped surface 41 of the ingot, the metal from the groove forming the chip 42. As the scalping and grooving take place, the hot scalped ingot enters the extrusion container with a clean surface ready for the extrusion operation which is conducted in the usual manner by advancing the ram 7 a sufficient distance into the bore 9 to cause the ingot metal to be extruded from the die of the extrusion press.

The groove 40 is made in the ingot for the purpose of facilitating the escape of air which tends to get trapped between the wall of the bore of the container and the smooth scalped surface of the ingot. A suitable size for the groove is about ½ inch wide and ⅛ inch deep.

Among the advantages of the invention are that the metal removed from the ingot in the scalping operation is in massive bands which are more readily salvageable with less melting loss than the turnings produced in conventional scalping; a closer fit of the scalped ingot and the extrusion container is obtained because the scalped ingot is hot and does not change dimensions due to the wide temperature changes to which conventionally scalped billets are subjected on being reheated after turning; the need for drilling centering holes in the ingot is eliminated and attendant metal loss obviated; the need for a separate machine for scalping is obviated; reheating the ingots after scalping is eliminated because the scalping is done while the ingot is at hot working temperature; a cleaner ingot surface is obtained because the freshly scalped metal surface is at heat and exposed to the air for only a short time before the extrusion operation; the time required for scalping by this method is drastically reduced.

Although there is shown, as a preferred embodiment of the invention, the hot working of ingot in cylindrical form and therewith a circular scalping die, it will be understood that the invention may be applied to ingot having other cross-sectional forms such as oval rectangular, etc. by employing a scalping die opening having a corresponding form. The above description is thus merely illustrative of the manner in which the principles of the invention may be utilized rather than limitative, and I desire to comprehend within my invention such modification as come within the scope of the following claims.

I claim:

1. In an extrusion press having an extrusion die, an extrusion container and a power-operated ram arranged to enter the container axially, the combination therewith of a scalping die having an annular cutting surface of working diameter slightly smaller than that of the container but larger than that of the ram, said scalping die being mounted in a position between the container and that of the ram when the latter is withdrawn to its fullest extent and in coaxial alignment with both.

2. A combinatiaon according to claim 1 wherein the scalping die is provided with at least one billet-grooving cutter projecting inwardly within the annular cutting surface.

3. A combination according to claim 1 wherein a series of guide members is provided around the scalping die adapted to guide thereinto the work piece.

References Cited in the file of this patent

UNITED STATES PATENTS

| Number | Name | Date |
|---|---|---|
| 383,239 | Palmer | May 22, 1888 |
| 1,501,081 | Wilcox | July 15, 1924 |
| 1,704,192 | Hoagland | Mar. 5, 1929 |
| 2,040,653 | Hanff | May 12, 1936 |
| 2,045,786 | Lorant | June 30, 1936 |
| 2,233,928 | Weaver | Mar. 4, 1941 |

FOREIGN PATENTS

| Number | Country | Date |
|---|---|---|
| 531,144 | Great Britain | Dec. 30, 1940 |
| 546,446 | Great Britain | July 14, 1942 |
| 719,653 | France | Feb. 9, 1932 |

OTHER REFERENCES

Ser. No. 362,833, Hanff (A. P. C.), published May 18, 1943.